United States Patent
Clarke et al.

(10) Patent No.: US 7,297,437 B2
(45) Date of Patent: Nov. 20, 2007

(54) BATTERY WITH GELLED ELECTROLYTE

(75) Inventors: Robert Clarke, Orinda, CA (US); Brian Dougherty, Menlo Park, CA (US); Stephen Harrison, Benicia, CA (US); J. Peter Millington, Chesire (GB); Samaresh Mohanta, San Diego, CA (US)

(73) Assignee: Plurion Limited, Glasgow (GB)

( * ) Notice: Subject to any disclaimer, the term of this patent is extended or adjusted under 35 U.S.C. 154(b) by 467 days.

(21) Appl. No.: 10/483,953

(22) PCT Filed: Feb. 12, 2002

(86) PCT No.: PCT/US02/04738

§ 371 (c)(1),
(2), (4) Date: May 24, 2004

(87) PCT Pub. No.: WO03/017394

PCT Pub. Date: Feb. 27, 2003

(65) Prior Publication Data

US 2004/0202939 A1    Oct. 14, 2004

(51) Int. Cl.
 *H01M 4/36* (2006.01)
(52) U.S. Cl. .................... 429/105; 429/218.1; 429/229
(58) Field of Classification Search .................... None
See application file for complete search history.

(56) References Cited

U.S. PATENT DOCUMENTS

| | | | |
|---|---|---|---|
| 3,776,779 A * | 12/1973 | Johnson ........................ 429/303 |
| 4,784,924 A | 11/1988 | Savinell et al. |
| 4,814,241 A | 3/1989 | Nagashima et al. |
| 5,061,578 A * | 10/1991 | Kozuma et al. ................ 429/3 |
| 5,318,865 A | 6/1994 | Kaneko et al. |
| 5,366,824 A | 11/1994 | Nozaki et al. |
| 5,610,802 A | 3/1997 | Eidler et al. |
| 5,851,694 A | 12/1998 | Miyabashi et al. |
| 6,296,783 B1 * | 10/2001 | Shindo et al. ................ 252/500 |
| 6,432,585 B1 * | 8/2002 | Kawakami et al. .......... 429/233 |
| 6,468,688 B2 | 10/2002 | Kazacos et al. |
| 6,475,661 B1 | 11/2002 | Pellegri et al. |
| 6,613,298 B2 | 9/2003 | Tanaka |
| 6,652,819 B2 | 11/2003 | Shiroto |
| 6,692,862 B1 | 2/2004 | Zocchi |
| 2001/0009741 A1 * | 7/2001 | Durkot et al. ................ 429/229 |

FOREIGN PATENT DOCUMENTS

WO      WO 96/35239    * 11/1996

OTHER PUBLICATIONS

Iwasa, et al., Fundamental Studies on the Electrolyte Solutions of Novel Redox Flow Battery for Electricity Storage, 2001, no month.
Fang, et al., A Study of the Ce(III)/Ce(IV) Redox Couple For Redox Flow Battery Application, Apr. 8, 2002.

* cited by examiner

*Primary Examiner*—Jonathan Crepeau
*Assistant Examiner*—Tony Chuo
(74) *Attorney, Agent, or Firm*—Fish & Associates, PC

(57) ABSTRACT

An electric device comprises a gelled acid electrolyte (142A) in complex with a lanthanide that forms a redox pair with a second element. Preferred electric devices include batteries and especially primary batteries, while preferred acid electrolytes (124A) have a sulfonic acid group. Contemplated lanthanides especially include cerium, and preferred second elements particularly include zinc. Alternatively, contemplated electric devices may comprise a gelled electrolyte (142A) in which with a lanthanide forms a redox pair with zinc.

20 Claims, 3 Drawing Sheets

BATTERY WITH GELLED ELECTROLYTE

FIELD OF THE INVENTION

The field of the invention is batteries and battery electrolytes.

BACKGROUND OF THE INVENTION

Many types of batteries and other power cells are known, based upon a relatively wide range of electrical couples, and among the most popular electrical couples are those containing zinc or lead.

For example, zinc is coupled with carbon in many simple flashlight batteries to provide a relatively inexpensive and reliable power source. Although manufacture of Zn/C batteries is generally simple and poses only relatively little environmental impact, various disadvantages of Zn/C batteries exist. Among other things, the ratio of power to weight in commonly used Zn/C batteries is relatively poor. Similarly, while lead is relatively inexpensive and is implemented in numerous batteries (e.g. car batteries), lead has appreciable toxicity. Furthermore, sulfuric acid spills from a typical lead-acid battery may pose a significant environmental and health hazard.

To circumvent at least some of the problems associated with acid electrolyte spills, gelling agents can be added to a lead acid battery to produce a gelled electrolyte. Gelled lead-acid battery electrolytes are generally known to reduce inadvertent electrolyte spills. Moreover, many gelled lead-acid battery electrolytes allow operation of batteries incorporating such electrolytes in tilted or even in inverted position (e.g., marine batteries). However, gelling the lead-acid battery electrolyte generally fails to reduce problems with lead toxicity and high ratio of power to weight.

To improve the ratio of power to weight, alternative zinc coupling partners and redox systems can be employed. For example, zinc can be coupled with mercury oxide or silver to achieve an improved power to weight ratio. However, the toxicity of mercury oxide is frequently problematic in manufacture and tends to become even more problematic when such batteries are discarded. On the other hand, while silver as a coupling partner for zinc is environmentally substantially neutral and significantly improves the power to weight ratio, the use of silver is in many instances economically prohibitive.

Alternatively, halogens may be employed as a coupling partner for zinc, and most common zinc-halogen couples include zinc-bromine and zinc-chloride. Zinc-halogen redox systems frequently have a relatively favorable weight-to-power ratio. Moreover, the capacity of such systems is typically only limited by the volume of the electrolyte. Consequently, zinc halogen based batteries are often employed for load leveling in power substations. However, such battery configurations are often difficult to integrate into portable or miniaturized devices Moreover, such battery configurations are often prone to leakage leading to significant problems due to the highly corrosive nature of halogens. Leakage may potentially be overcome by gelling electrolyte, however, most likely at the cost of significant disadvantages.

Among other things, pumping of gelled electrolytes from anolyte and/or catholyte reservoirs is technically challenging, if not impossible, under normal operating conditions known for such systems. Furthermore, gelling agents in such systems need not only to be electrochemically inert but also chemically inert to the corrosive nature of the electrolytes.

Alternatively, zinc air battery systems may be employed in applications where a favorable ratio of weight to capacity is particularly important. In such zinc air batteries, atmospheric oxygen is used as a gaseous coupling partner for zinc, which is typically provided in form of gelled zinc powder anodes. Among the various advantages in such batteries, using air (i.e., oxygen) as coupling partner for zinc significantly reduces weight. However, reasonable shelf life of such batteries can often only be achieved by using an airtight seal. Furthermore, to provide continuous operation, air must have an unobstructed path through the battery to the cathode so that the oxygen in the air is available to discharge the cathode. Moreover, commercial applications of zinc-air batteries have previously been limited to primary or non-rechargeable types. Experimental rechargeable zinc-air batteries have been built for use in automotive applications and typically use a liquid electrolyte that is recirculated via a pump. However, such systems are often impractical for miniature consumer applications ranging from radios to portable computers because of their mechanical complexity and lack of leak resistance.

Thus, although numerous batteries with relatively favorable weight-to-capacity ratios are known in the art, all or almost all of them suffer from one or more disadvantage. Therefore, there is still a need to provide improved batteries.

SUMMARY OF THE INVENTION

The present invention is directed to an electric device that includes a gelled acid electrolyte comprising a complexed lanthanide that forms a redox pair with a second element. Especially contemplated electric devices include batteries (e.g., a primary battery).

In one aspect of the inventive subject matter, contemplated gelled acid electrolytes comprise a sulfonic acid group, and in a particularly contemplated aspect the sulfonic acid group is covalently bound to an optionally substituted linear or branched alkyl. Further preferred gelled acid electrolytes may include a second sulfonic acid group. Alternatively, the sulfonic acid group may also be covalently bound to a polymer.

In another aspect of the inventive subject matter, contemplated lanthanides include cerium, praseodymium, neodymium, terbium, and dysprosium. Alternatively, suitable lanthanides may also include samarium, europium, thulium and ytterbium, and it is still further contemplated that suitable electrolytes may also form a complex with a second lanthanide. Preferred second elements particularly include zinc. Thus, contemplated batteries include those having an open circuit voltage of at least 2.3 Volt per cell.

In alternative aspects of the inventive subject matter, contemplated electric devices include batteries having a gelled electrolyte in which with a lanthanide forms a redox pair with zinc. Contemplated batteries especially include primary batteries wherein the electrolyte has an acidic pH. Preferred gelled electrolytes include organic polymers, and especially preferred gelled electrolytes include carboxymethylcellulose, poly(acrylic acid), poly(acrylo nitrile), and a poly(vinylidene fluoride).

Various objects, features, aspects, and advantages of the present invention will become more apparent from the following detailed description of preferred embodiments of the invention, along with the accompanying drawing.

DETAILED DESCRIPTION

Figure 1A:
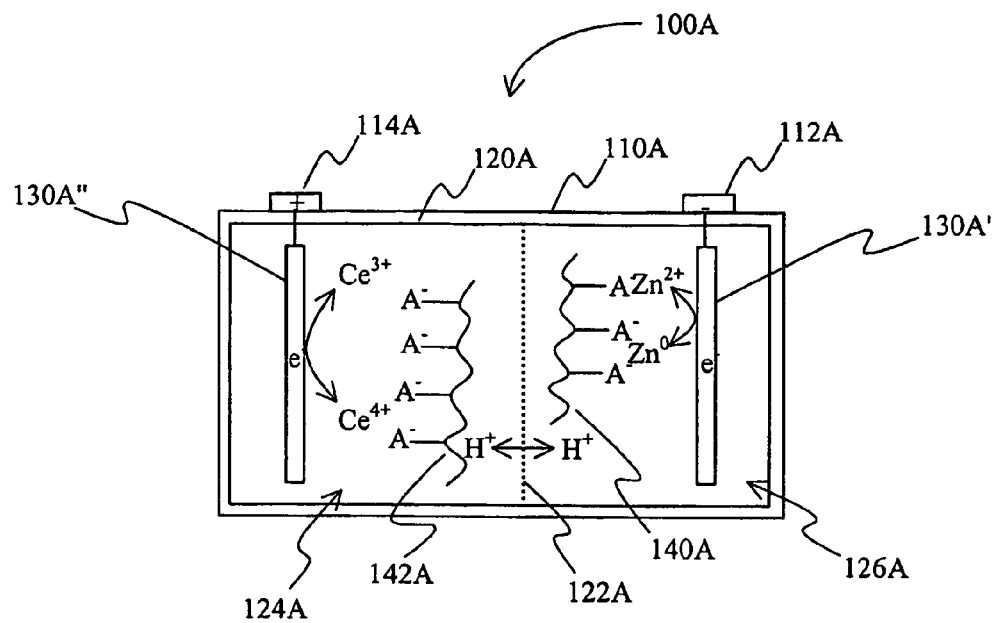
FIG. 1 is a schematic view of an exemplary battery according to the inventive subject matter.

The inventors have discovered that an electric device (e.g., a battery) may include a gelled electrolyte comprising a complexed lanthanide that forms a redox pair with a second element. Alternatively or additionally, contemplated electric devices may comprise a gelled electrolyte in which a lanthanide (e.g., cerium) and a second element (e.g., zinc) form a redox pair in the electrolyte.

As used herein, the term "redox pair" is interchangeably used with the term "redox couple" and refers to a combination of a first element (or ion of the first element) and second element (or ion of the second element) in a battery, in which reduction of the first element and oxidation of the second element produce the current provided by the battery.

As also used herein, the term "acid electrolyte comprising a complexed lanthanide" means that the lanthanide (typically in ionic form) is bound in the acid electrolyte via a non-covalent bond to a compound (typically an anion or anionic group in a polymer). Similarly, the term "electrolyte further comprises a second complexed lanthanide" means that the second element (typically in ionic form) is bound in the acid electrolyte via a non-covalent bond. Especially contemplated non-covalent bonds include electrostatic, ionic, and complex bonds.

As further used herein, the term "anode" refers to the negative electrode of a battery (i.e., the electrode where oxidation occurs) during discharge of the battery. Thus, the term "anode compartment" refers to the battery compartment that includes the anode, and the term "anolyte" refers to the electrolyte in the anode compartment. Similarly, the term "cathode" refers to the positive electrode of a battery (i.e., the electrode where reduction occurs) during discharge of the battery. Thus, the term "cathode compartment" refers to the battery compartment that includes the cathode, and the term "catholyte" refers to the electrolyte in the cathode compartment.

As still further used herein, the term "gelled electrolyte" refers to a colloid in which the disperse phase (here: the electrolyte or gelling agent) has combined with the dispersion medium (typically an aqueous system) to produce a semisolid material. Gelled electrolytes may also be defined by one or more of their physical properties. For example, under the scope of this definition, a gelled electrolyte will typically have a dynamic viscosity of at least 100 cP (centi-Poise), more typically a viscosity of at least 1,500 cP, even more typically a viscosity of at least 10,000 cP, and most typically a viscosity of at least 250,000 cP (all measured at room temperature). It should further be appreciated that the term "gelled electrolyte" also includes solid (polymer) electrolytes.

Based on previous experiments (infra), such cerium-zinc redox couples have an open circuit voltage of at least 2.4 Volt, and more typically 2.46 Volt, which is superior to numerous other redox couples. In such configurations, the inventors contemplate that zinc will be dissolved into the electrolyte on discharge of the battery and plated onto the electrode during charging following the equation (I) below. On the other electrode cerium ions will donate/receive electrons following the equation (II) below.

Discharging: $Zn^0 - 2e^- \; Zn^{+2}$ Charging: $Zn^{+2} + 2e^- \; Zn^0$ (I)

Discharging: $2Ce^{+4} + 2e^- \; 2Ce^{+3}$ Charging: $2Ce^{+3} - 2e^- \; 2Ce^{+4}$ (II)

In an exemplary Zn/Ce redox system using methane sulfonic acid as a component in the electrolyte, it is contemplated that the following reactions occur during charging (The reactions are reversed on discharge):

Cathode: $2Ce(CH_3SO_3)_3 + 2CH_3SO_3H \; 2Ce(CH_3SO_3)_4 + 2H^+$

Anode: $Zn(CH_3SO_3)_2 + 2H^+ \; Zn^0 + 2CH_3SO_3H$

Therefore, it should be recognized that only hydrogen ions are moving through the membrane (i.e., the separator) in a battery during charge and discharge. Consequently, particularly contemplated membranes include those that allow flow of hydrogen across the membrane. There are numerous such membranes known in the art, and all of those are deemed suitable for use in conjunction with the teachings presented herein. For example, all or almost all known solid polymer electrolytes are contemplates uitable for use herein. However, a particularly preferred membrane includes a Nafion® membrane (Perfluorosulfonic acid—PTFE copolymer in the acid form; commercially available from DuPont, Fayetteville, N.C.). Furthermore, it should be especially recognized that in contemplated batteries membranes are suitable for use even if such membranes exhibit some leakage or permeability for catholyte and/or anolyte into the opposite compartment, since contemplated batteries are operable even under conditions in which the electrolytes are mixed (supra). Various aspects of mixed electrolytes in contemplated batteries are disclosed in the PCT patent application entitled "Mixed Electrolyte Battery" by Robert Lewis Clarke, Brian J. Dougherty, Stephen Harrison, J. Peter Millington and Samaresh Mohanta, which was filed on or about Feb. 12, 2002, which is incorporated herein by reference.

Thus, preferred gelled electrolytes include one or more anions of an organic or inorganic acid. Incorporation of anions of an organic or inorganic acid into a gelled electrolyte may conceptually be implemented in two distinct approaches.

In one approach, contemplated electric devices will advantageously employ an acid electrolyte in the presence of a gelling agent, and especially preferred acid electrolytes include organic acids. It is further generally preferred that such organic acids (a) have a relatively high solubility in aqueous or non-aqueous medium, and (b) can complex (e.g., via salt formation) or otherwise bind at least one element (in ionic form) of the redox couple to retain the element in the solution or medium. Particularly preferred organic acids include those that are able to dissolve ceric ions, cerous ions and zinc ions at a relatively high concentration (e.g., greater than 0.2M, more preferably greater than 0.5M, and most preferably greater than 0.7M), and an especially suitable organic acid is methane sulfonic acid (MSA).

However, alternative organic acids also include trifluoromethane sulfonic acid ($CF_3SO_3H$), which is thought to make a better solvent anion than methane sulfonic acid for ceric ions. Still further contemplated acids include inorganic acids such as perchloric acid ($HClO_4$), nitric acid, hydrochloric acid (HCl), or sulfuric acid ($H_2SO_4$). However, such alternative acids may impose safety concerns or exhibit less advantageous capability to dissolve high concentrations of ceric ions. Still further, it should be appreciated that in alternative aspects any Bronsted acid (a compound that donates a hydrogen ion ($H^+$) to another compound) may be employed as counter ion in the electrolyte.

With respect to the concentration of the MSA or other acid it should be appreciated that the concentration of MSA or other acid is not limiting to the inventive subject matter. However, a particularly preferred concentration of methane sulfonic acid is in the range of between 1M and 4M, and more preferably between 2.5M and 3.5M. In further alternative aspects of the inventive subject matter, it is contemplated that EDTA or alternative chelating agents could replace at least a portion, if not all of the methane sulfonic acid in at least the zinc cathode part of the cell.

There are numerous gelling agents for battery electrolytes known in the art, and all of the known gelling agents are considered suitable for use herein. For example, particularly suitable gelling agents include carboxymethylcellulose, polyacrylic acids, poly(acrylo nitrites), poly(vinylidene fluoride), or any reasonable combination thereof. It should be recognized that such gelling agents may have any concentration in the battery electrolyte, however, preferred concentrations are typically in the range of between about 0.1 wt % to about 30 wt %, and most preferably between about 5 wt % and about 12 wt %. Other suitable gelling agents maybe found in U.S. Pat. Nos. 5,834,136, 6,288,187, and 6,296,783, all incorporated by reference herein. In further preferred aspects of the inventive subject matter, gelling agents are substantially stable (i.e., no more than 10 degradation, preferably no more than 5% degradation over period of intended use) towards acidic solutions and electrochemical oxidation.

In the other approach, contemplated electric devices will advantageously employ a gelled acid electrolyte that includes a complexed lanthanide. For example, in a preferred battery configuration, a redox couple is formed by zinc and cerium (various aspects of this redox couple see above), wherein the cerium is in complex with sulfonic acid groups that are covalently bound via an optional spacer to a poly(acrylic acid) polymer as depicted in Structure 1 below.

Structure 1

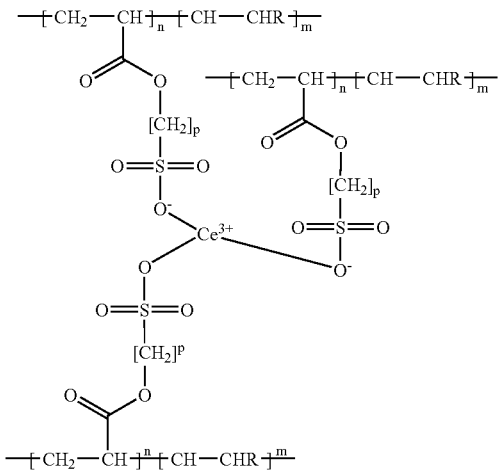

wherein N, m, and p are in such structures independently between zero and several 1000, and R is a carboxylic acid group or a sulfonic acid group, which may further be esterified or otherwise covalently coupled with a moiety that may contain an anionic form of an organic or inorganic acid (e.g., alkylsulfonic acid).

It should further be recognized that the $Ce^{3+}$ ion may be complexed with sulfonic acid groups that are attached to a single polymeric strand, or to two or more independent polymeric strands. Moreover, during operation of such electrolytes, the $Ce^{3+}$ ion may be oxidized to a $Ce^{4+}$ ion, which may then be complexed by yet another sulfonic acid group from the same or another polymeric strand.

Figure 2A:
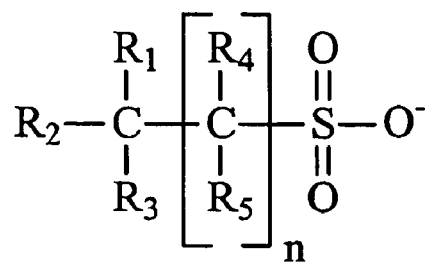
FIGS. 2A and 2B are schematic structures of exemplary electrolytes according to the inventive subject matter.

Similarly, various alternative counter ions for the cerium and/or zinc ions are also contemplated and especially include those described above. Therefore, particularly suitable counter ions include various inorganic and organic acids and Bronsted acids. Thus, by complexation of a ceric or cerous ion by an organic or inorganic acid, it should be recognized that $H^+$ is liberated from the acid. There are numerous polymeric compounds commercially available that include sulfonic or other acid groups as pendent or otherwise attached groups, and all of those are especially contemplated herein (e.g., various solid polymer electrolytes). Furthermore, where a particularly desirable gelled electrolyte is not commercially available, it is contemplated that such compounds may be synthesized from commercially available precursors using protocols well known in the art (see e.g., Advanced Organic Chemistry, Fourth Edition—Part A: Structure and Mechanism Part B: Reaction and Synthesis by Richard J. Sundberg, Francis A. Carey; ISBN: 0306462443, or Comprehensive Organic Transformations: A Guide to Functional Group Preparations by Richard C. Larock; ISBN: 0471190314, or Polymer Synthesis and Characterization: A Laboratory Manual by Stanley R. Sandler (Editor), Wolf Karo, Eli M. Pearce; ISBN: 012618240X). An exemplary alternative gelled electrolyte is depicted in Structure 2 below and FIG. 2A Structure 2

Figure 2B:
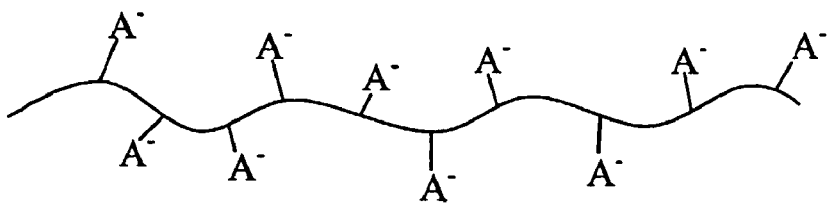

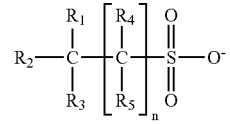

wherein n is between 0 and 20, and wherein $R_1$-$R_5$ are independently H, alkyl, alkenyl, alkynyl, aryl, alkaryl, all of which may be linear or branched, and all of which may further be substituted with one or more substituents. Suitable substituents include polar (e.g., OH, SH, etc.), ionic (e.g., sulfonic acid anion, quaternary ammonium, etc.), hydrophilic (e.g., $NH_2$, C(O), etc.), and halogen (e.g., F or Cl). Alternatively, and especially where the gelled electrolyte comprises a polymer, contemplated polymers may be linear or branched, and will further comprise at least one organic or inorganic acid group covalently bound to the backbone of the polymer, herein the acidic group may be pending (e.g., via a spacer), integral part of the backbone (i.e., when removed, the backbone will be discontinuous), or in a terminal position with or without a spacer. An exemplary contemplated polymer with a plurality of acidic groups attached thereto is depicted in FIG. 2B.

Still further, it should be recognized that such gelled electrolytes may not only form a complex with cerium ions, but may also form a complex with lanthanides other than cerium, and in a particularly preferred aspect of the inventive subject matter, contemplated gelled electrolytes will form a complex with the second element in the redox pair (e.g., $Zn^{2+}$). Moreover, it is contemplated that suitable electric devices may include both gelling agents and a gelled electrolyte in complex with a lanthanide.

Depending on the particular viscosity of contemplated gelled electrolytes it should be recognized that, especially where the electric device is a battery and the viscosity is relatively high (i.e., above 10,000 cP), such batteries are preferably primary batteries.

With respect to the amount of the lanthanide, and particularly the amount of cerium in contemplated electric devices, it is contemplated that the cerium ion concentration may vary considerably and may generally be in the range of between one micromolar (and even less) and the maximum saturation concentration of the particular cerium ion. However, it is preferred that the cerium ion concentration in the electrolyte is at least 0.2M, more preferably at least 0.5M, and most preferably at least 0.7M. Viewed from another perspective, it is contemplated that preferred lanthanide ion concentrations lie within 5%-95% of the solubility maximum of the lanthanide ions in the electrolyte at a pH<7 and 20° C.

It is further contemplated that the cerium ions may be introduced into the electrolyte in various forms. However, it is preferred that cerium ions are added to the electrolyte solution in form of cerium carbonate, numerous alternative forms, including cerium hydrate, cerium acetate, or cerium sulfate are also contemplated. Similarly, the concentration of zinc ions in the electrolyte is at least 0.3M, more preferably at least 0.8M, and most preferably at least 1.2M. With respect to the particular form of zinc addition to the electrolyte, the same considerations as described above apply. Thus, contemplated zinc forms include $ZnCO_3$, ZnAcetate, $Zn(NO_3)_2$, etc. Further contemplated aspects of alternative redox couples and configurations are disclosed in the PCT patent application entitled "Cerium Batteries" filed on or about Robert Lewis Clarke, Brian J. Dougherty, Stephen Harrison, J. Peter Millington and Samaresh Mohanta, which was filed on or about Feb. 12, 2002, which is incorporated herein by reference.

FIG. 1A depicts an exemplary battery 100A with a housing 110A and contacts 112A and 114A. Contacts 112A and 114A are in electrical communication with the respective electrodes (e.g., graphite) 130A' and 130A", which are disposed in at least one battery cell 120A. The cell 120A is divided by separator 122A (e.g., Nafion® membrane) into compartment 124A and compartment 126A. Compartment 124A includes electrode 130A" that is disposed in the gelled acid electrolyte 142A in complex with cerium and/or cerous ions, while compartment 126A includes electrode 130A' that is disposed in the gelled acid electrolyte 140A in complex with zinc ions (zinc metal is typically plated onto the electrode).

Figure 1B:
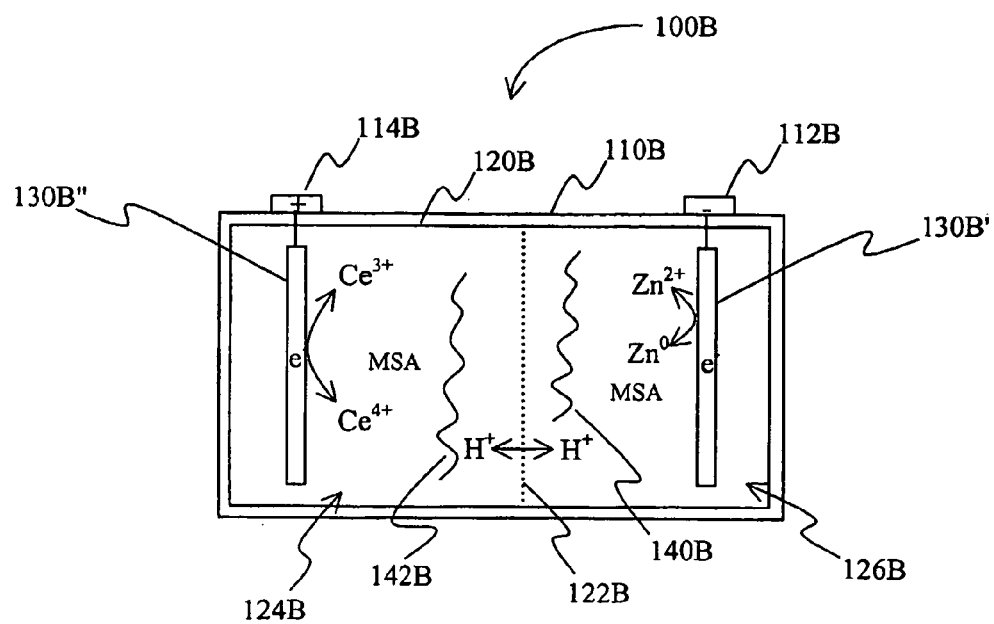

Alternatively, as depicted in FIG. 1B, an exemplary battery 100B has a housing 110B and contacts 112B and 114B. Contacts 112B and 114B are in electrical communication with the respective electrodes (e.g., graphite) 130B' and 130B", which are disposed in at least one battery cell 120B. The cell 120B is divided by separator 122B (e.g., Nafion® membrane) into compartment 124B and compartment 126B. Compartment 124B includes electrode 130B" that is disposed in the acid electrolyte (here: MSA) that comprises gelling agent 142B and cerium and/or cerous ions, while compartment 126B includes electrode 130B' that is disposed in the acid electrolyte (here: MSA) that comprises gelling agent 140B and zinc ions (zinc metal is typically plated onto the electrode).

In especially contemplated alternative aspects of the inventive subject matter, it is contemplated that the lanthanide need not be limited to cerium, and numerous alternative lanthanides are also considered suitable for use herein. Especially contemplated alternative lanthanides (e.g., praseodymium, neodymium, terbium, dysprosium, samarium, europium, thulium, or ytterbium) are described in copending PCT application entitled "Lanthanide Batteries", filed on or about Robert Lewis Clarke, Brian J. Dougherty, Stephen Harrison, J. Peter Millington and Samaresh Mohanta, which was filed on or about Feb. 12, 2002, which is incorporated by reference herein. Moreover, it is contemplated that suitable electrolytes may complex at least a second lanthanide.

In a still further contemplated aspect of the inventive subject matter, and especially where it is desirable to obtain a relatively high current efficiency of zinc plating during charging, it is preferred that Indium is added to the electrolyte to significantly increase the hydrogen overpotential. Addition of Indium is thought to act as a barrier to hydrogen evolution, thereby forcing zinc deposition upon charging of the battery. While addition of indium to alkaline electrolytes has been previously shown to reduce hydrogen the hydrogen overpotential, the inventors surprisingly discovered that zinc deposition in an acid electrolyte in the presence of indium ions was almost 95% efficient compared to 70-80% without indium (at less than 1% substitution of indium ions for zinc ions in the electrolyte).

Of course, it should be recognized that reduction of the hydrogen overpotential in contemplated batteries need not be limited to addition of indium to the electrolyte at a particular concentration, but various alternative elements (typically metals, most typically group 13 elements) at numerous other concentrations are also contemplated. For example, suitable elements include bismuth (Bi), tin (Sn), gallium (Ga), thallium (Tl), and various oxides, including diindium trioxide ($In_2O_3$), dibismuth trioxide ($Bi_2O_3$), tin oxide (SnO) and digallium trioxide ($Ga_2O_3$). With respect to the concentration of metals and other hydrogen overpotential reducing compounds, it is generally preferred that the concentration is less than 5 mol % (relative to Zn), more typically less than 2 mol % (relative to Zn), and even more typically less than 1 mol % (relative to Zn). However, and especially where such elements or other compounds exhibit a relatively high solubility, concentrations of more than 5 mol % (relative to Zn) are also considered suitable.

In yet further alternative aspects of the inventive subject matter, it is contemplated that suitable batteries may be configured in a battery stack in which a series of battery cells are electrically coupled to each other via a bipolar electrode. The particular nature of the bipolar electrode is not limiting to the inventive subject matter, and it is generally contemplated that any material that allows for oxidation of cerous ions to ceric ions during charging (and the reverse reaction during discharge) is suitable for use herein. However, a particularly preferred material for a bipolar electrode is glassy carbon. The inventors surprisingly discovered that glassy carbon provides, despite operation in a highly acidic electrolyte, an excellent substrate for plating of zinc during charging. Furthermore, glassy carbon is a relatively inexpensive and comparably light-weight material, thereby further improving the ratio of cost/weight to capacity. Further contemplated aspects of bipolar electrodes are disclosed in US provisional patent application with the title "Electric Devices With Improved Bipolar Electrode", filed on or about Robert Lewis Clarke, Brian J. Dougherty, Stephen Harrison, J. Peter Millington and Samaresh Mohanta, which was filed on or about Feb. 12, 2002, which is incorporated by reference herein.

Figure 3:
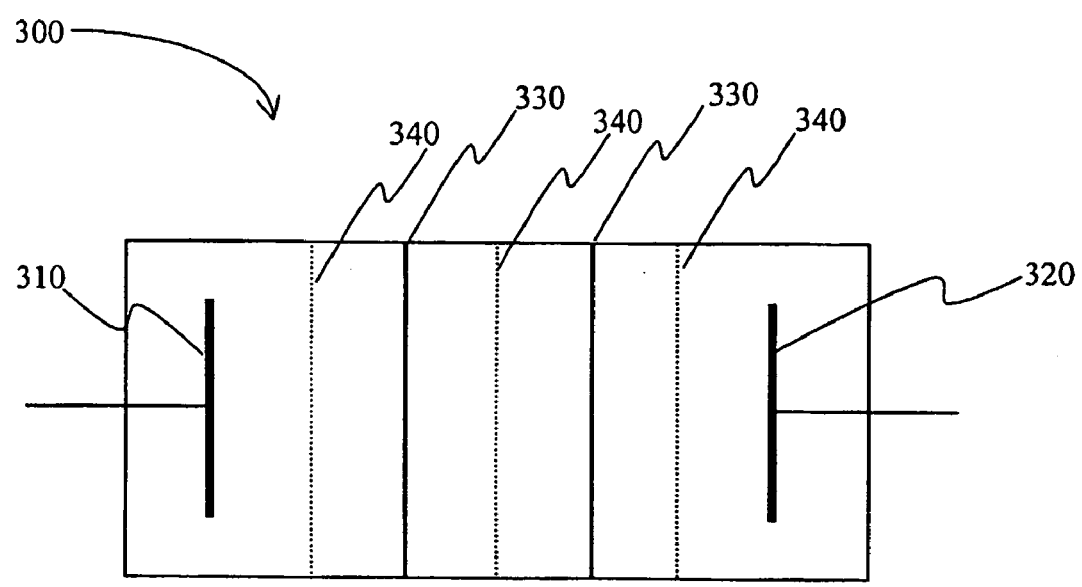
FIG. 3 is a schematic view of another exemplary battery according to the inventive subject matter.

An exemplary stacked battery configuration is depicted in FIG. 3 in which the battery 300 has a cathode 310 and an anode 320, and wherein a plurality of diaphragms 340 separate the battery in a plurality of cells. Each of the cells (excluding the cells that comprise the anode or cathode) includes a bipolar electrode 330.

Similarly, while in some battery configurations a Nafion® membrane may operate more satisfactorily than other membranes, it is generally contemplated that the exact physical and/or chemical nature of the membrane is not limiting to the inventive subject matter so long as such membranes allow H+ exchange between an anode and cathode compartment in contemplated acidic electrolytes. Consequently, it should be appreciated that numerous alternative membranes other than Nafion are also suitable, and exemplary membranes include all known solid polymer electrolyte membranes, or similar materials.

It should be especially recognized that in contemplated batteries membranes are suitable for use even if such membranes exhibit some leakage or permeability for catholyte and/or anolyte into the opposite compartment, since contemplated batteries are operable even under conditions in which the electrolytes are mixed.

It should be especially appreciated that the capacity of contemplated batteries is typically limited only by the supply of the anolyte and catholyte. Consequently, it is contemplated that a particular capacity of such batteries will predominantly be determined by a particular type of application. For example, where the application is a relatively small, non-rechargeable battery (e.g., AAA-type battery), contemplated anolyte and catholyte volumes may be between about 0.5 ml and 5 ml. In another example, where the battery is employed as an automobile starter or secondary battery, contemplated anolyte and catholyte volumes may be between about 50 ml and 3000 ml. In a further example, where the battery is a relatively large battery (e.g., load leveling batteries at power substations and commercial/industrial locations with a capacity of 100,000 kWh, and even more), contemplated anolyte and catholyte volumes may be between about $5m^3$ and $500m^3$. Various aspects of configurations and use of contemplated batteries with especially high capacity is described in pending PCT application with the title "improved load leveling battery and methods therefor", serial No. PCT/US01/41678, which is incorporated by reference herein.

Thus, it should be appreciated that contemplated battery configurations will lend themselves particularly well for primary batteries. However, it should be recognized that contemplated electrolytes and battery configurations may also be employed for secondary batteries, especially where the viscosity of the electrolyte allows pumping of the electrolyte (anolyte and/or catholyte) between the cell compartment and a reservoir.

EXPERIMENTS

Battery with Gelled Acid Electrolyte Comprising Complexed Cerium

Based on previous experiments with rechargeable Ce—Zn batteries, a cell is built by using four blocks of plastic Ultra High Molecular Weight Polyethylene (UHMWP), with gaskets in between each face, two electrodes, and a Naflon® membrane that separates the cell into two compartments. Electrolyte inlets are formed in the top portion of each compartment, and the electrolyte is introduced into the compartment via the inlet.

The gelled acid electrolyte will comprise between about 2 wt % to about 10 wt % sulfonated poly(vinylidene fluoride) or poly(vinyl fluoride) (e.g., produced via direct sulfonation with chlorosulfonic acid) in aqueous solution, wherein the sulfonic acid groups complex $Ce^{3+}$ and/or $Ce^{4+}$ that have previously been dissolved in the aqueous medium. Addition of the sulfonated polymer to the cerium containing aqueous solution will form the gelled acid electrolyte by forming a complex with the cerium ions in the aqueous solution. The cerium-containing aqueous solution will contain 106 gram $Ce_2(CO_3)_3*5H_2O$ in 480 ml methane sulfonic acid and 320 ml of water prior to combination with 50 gram sulfonated PVDF. The zinc-containing aqueous solution will contain 65 grams zinc carbonate in 240 ml methane sulfonic acid and 160 ml of water prior to combination with 22 gram sulfonated PVDF. The ceric solution will be fed to the cathode made of coated titanium mesh ($TiO_2$), and the zinc solution will be fed to a titanium anode. Cell gap will be 2.54 cm.

The cell will be charged at 0.5 A (current density is 50 $mA/cm^2$) for between about 2-24 hours. Based on previous experiments, it is contemplated that the open circuit voltage maximum will be at least 2.3V, and more typically at least 2.4V. Alternatively, it is contemplated that charging the battery, and especially where the battery is a primary battery, may be substantially performed as described below, wherein the aqueous solutions on the cerium side and the zinc side are subsequently admixed with the sulfonated polymers to form the gelled acid electrolyte.

Battery with Gelled Electrolyte Containing Ce—Zn as Redox Pair

Similarly, the same cell as described may be employed in a battery that will include a cerium-zinc redox pair in an electrolyte that further includes a gelling agent (e.g., poly (acrylic acid)). In such a configuration, the cerium solution will contain 106 grams $Ce_2(CO_3)_3*5H_2O$ in 480 ml methane sulfonic acid and 320 ml of water. The zinc solution will contain 65 grams zinc carbonate in 240 ml methane sulfonic acid and 160 ml of water. The ceric solution will be fed to the cathode made of coated titanium mesh ($TiO_2$).The zinc solution will be fed to the titanium anode. Cell gap will be 2.54 cm, and flow rate of the aqueous solutions circulating from a reservoir to the respective compartment is about 2 liter per minute.

The cell will be charged at 0.5 A (current density is 50 $mA/cm^2$) for five hours, and further run overnight at 0.2 A current followed by an additional 5 hours at 0.5 A. The open circuit voltage maximum is contemplated to be at least 2.3V, and more typically at least 2.4V. After charging, the aqueous solutions are combined with a suitable amount of gelling agent (e.g., between 2 wt % and 12 wt % carboxymethylcellulose), the compartments are closed, and the battery is ready for use.

Thus, specific embodiments and applications of lanthanide batteries have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A battery having a gelled acid electrolyte comprising a complexed lanthanide that forms a redox pair with zinc in which reduction of the lanthanide and oxidation of the zinc produce current provided by the battery, and wherein the lanthanide forms a complex with a sulfur-containing anionic group.

2. The battery of claim 1 wherein the battery is a secondary battery.

3. The battery of claim 2 wherein the battery is a primary battery.

4. The battery of claim 2 wherein the gelled acid electrolyte comprises a sulfonic acid group.

5. The battery of claim 4 wherein the sulfonic acid group is covalently bound to a linear alkyl or a branched alkyl, and wherein the linear alkyl or branched alkyl may further be substituted with a substituent.

6. The battery of claim 4 wherein the sulfonic acid group is covalently bound to a polymer.

7. The battery of claim 4 wherein at least a second sulfonic acid group is covalently bound to the linear alkyl or a branched alkyl.

8. The battery of claim 1 wherein the lanthanide is selected from the group consisting of cerium, praseodymium, neodymium, terbium, and dysprosium.

9. The battery of claim 1 wherein the lanthanide is selected from the group consisting of samarium, europium, thulium and ytterbium.

10. The battery of claim 1 wherein the gelled acid electrolyte further comprises indium.

11. The battery of claim 1 wherein the redox pair provides an open circuit voltage of at least 2.3 Volt per cell.

12. The battery of claim 2 wherein the gelled acid electrolyte forms a complex with the second element.

13. An electric device having a gelled acidic electrolyte in which with a lanthanide forms a redox pair with zinc in which reduction of the lanthanide and oxidation of the zinc produce current provided by the electric device.

14. The electric device of claim 13 wherein the device is a primary battery.

15. The electric device of claim 13 wherein the acidic pH is provided by an acid having an alkylsulfonic acid.

16. The electric device of claim 13 wherein the lanthanide is selected from the group consisting of cerium, praseodymium, neodymium, terbium, and dysprosium.

17. The electric device of claim 13 wherein the lanthanide is selected from the group consisting of samarium, europium, thulium and ytterbium.

18. The electric device of claim 13 wherein the gelled electrolyte comprises an organic polymer.

19. The electric device of claim 18 wherein the organic polymer is selected from the group consisting of a carboxymethylcellulose, a polyacrylic acid, a poly(acrylonitrile), and a poly(vinylidene fluoride).

20. The electric device of claim 13 wherein the gelled electrolyte further comprises indium.

* * * * *